United States Patent [19]

Renault et al.

[11] 3,862,335

[45] Jan. 21, 1975

[54] PROCESS FOR PRODUCING SULFUR FROM A GAS CONTAINING HYDROGEN SULFIDE AND SULFUR DIOXIDE

[75] Inventors: Philippe Renault, Noisy-le-Roi; Andre Deschamps, Chatou; Claude Dezael, Maisons-Laffitte, all of France

[73] Assignee: Institut Francais du Petrole des Carburants et Lubrifiants, Rueil Malmaison, France

[22] Filed: Apr. 3, 1973

[21] Appl. No.: 347,540

[30] Foreign Application Priority Data

Apr. 10, 1972 France .............................. 72.12566

[52] U.S. Cl. ................................ 423/575, 423/578
[51] Int. Cl. ............................................. C01b 17/04
[58] Field of Search ........... 423/567, 571, 573, 574, 423/575, 578; 208/207, 208, 230; 23/267 S; 210/51

[56] References Cited

UNITED STATES PATENTS

| 1,974,724 | 8/1934 | Rosenstein ...................... 208/230 X |
| 2,202,901 | 6/1940 | Dreyfus ............................. 208/230 |
| 3,149,920 | 8/1964 | Urban ................................ 423/575 |
| 3,441,379 | 4/1969 | Renault ............................. 423/575 |
| 3,474,028 | 10/1969 | Bulian et al ....................... 208/230 |
| 3,489,677 | 1/1970 | Thompson ........................ 208/236 |
| 3,748,827 | 7/1973 | Bulian et al ....................... 208/230 |

Primary Examiner—G. O. Peters
Attorney, Agent, or Firm—Millen, Raptes & White

[57] ABSTRACT

Process for producing sulfur from a gas containing hydrogen sulfide and sulfur dioxide, wherein the gas is contacted with an organic solvent and the obtained molten sulfur is thereafter separated from the organic solvent, said process comprising the introduction of ammonia into the sulfur settling zone, so as to improve the separation of sulfur from the organic solvent medium.

11 Claims, No Drawings

PROCESS FOR PRODUCING SULFUR FROM A GAS CONTAINING HYDROGEN SULFIDE AND SULFUR DIOXIDE

We know a process for manufacturing sulfur from a gas containing hydrogen sulfide and sulfur dioxide in which the gas is contacted with an organic solvent selected, for example, from the glycols and polyglycols and their ethers and esters. The obtained sulfur is separated, preferably in the molten state, from the organic solvent. The reaction temperature is usually lower than 180°C, and preferably within the range of direct formation of molten sulfur, i.e., from about 115° to about 170°C. Catalysts may be advantageously used, for example ammonia, alkali metal salts of weak acids or inorganic bases.

When operating according to this process, the acid gases, i.e., $SO_2$ and $H_2S$, are supplied separately or as a mixture to the liquid reaction mixture through which they bubble. Processes of that type are disclosed, for example, in the U.S. Pat. Nos. 3,441,379; 3,561,925; 3,598,529 and in the French Pat. Nos. 1,492,013; 1,556,966; 1,568,748; 1,582,766; 1,592,092; 2,122,674; 2,123,778 and 2,128,953.

It has now been found, and this is the object of the invention that, when injecting ammonia into the settling zone for sulfur obtained by reacting $H_2S$ with $SO_2$, the coalescence of the sulfur droplets is facilitated and the separation between sulfur and the reaction mixture is improved.

The improvement achieved by the invention is particularly significant when the process for producing sulfur is carried out with a gas containing $H_2S$ and $SO_2$ in a ratio of $H_2S$ to $SO_2$ lower than 2:1 by volume, for example from 0.4:1 to 1.9:1. Under these conditions, the separation between the formed sulfur and the reaction mixture is not so good As with a ratio of $H_2S$ to $SO_2$ of at least 2 : 1; the produced sulfur then appears in the form of droplets coated with solvent, and is therefore of reduced purity. When processing, the settling zone may be separated from the reaction zone or may constitute a portion thereof, for example the bottom of a reactor of the column type. Ammonia is supplied to the molten sulfur in the settling zone, preferably at the lower portion thereof.

The invention may be illustrated as follows:

A plant is fed with a fume having a ratio $H_2S/SO_2$ lower than 2 by volume. Sulfur appears within the reaction mixture; under these conditions, there is formed, within the settling zone, a layer of sulfur droplets, emulsified in the solvent medium, having a thickness of several centimeters.

Now, when working according to the present invention, i.e., by supplying ammonia to the settling zone, or emulsion containing zone, it may be observed that the droplets quickly coalesce and that a sharp interface separates the reaction mixture from the settled sulfur.

The effect of ammonia is significant for injection rates of at least 0.1 percent by weight of the produced sulfur. The injection rate is advantageously 0.1–10 percent by weight of the produced sulfur, these values being not limitative. The so-supplied ammonia may then pass across the reaction zone where it acts as a catalyst. Ammonia may also be recycled to the settling zone, without passing through the reaction zone, although this is less preferable.

The color of the obtained sulfur is improved.

It may be said that the effect does not merely result from stirring the mixture in the decantation zone since, when supplying a constituent other than ammonia, for example an inert gas such as nitrogen or steam, into the settling zone of the operated plant, the coalescence of the sulfur droplets is not improved and there always remains an emulsified layer at the bottom of the settler.

Ammonia may be supplied either as an ammonia solution or in the gaseous state or as contained in a gas mixture resulting from vaporizing an aqueous solution of ammonia or ammonium sulfide.

When injecting an aqueous solution, the contact with the molten sulfur results in the vaporization of the solution with ammonia release.

The following non limitative examples illustrate the invention:

EXAMPLE 1 (given by way of comparison)

300 cc of polyethylene glycol of molecular weight 400, containing 2 g of potassium benzoate, are introduced into a column of a 4 cm diameter, provided with perforated plates. The solution is maintained at 130°C.

A waste gas whose flow rate is 500 liters per hour is supplied under atmospheric pressure. Its composition in percent by volume is:

| $SO_2$ | $H_2S$ | $H_2O$ | $CO_2$ | $N_2$ |
|---|---|---|---|---|
| 0.5 | 0.75 | 25 | 16 | 57.75 |

0.3 liter of ammonia per hour is also supplied thereto. The waste gas and ammonia are injected about 10 cm above the bottom of the column, so as to leave a quiet zone for sulfur settling at the bottom of the column.

The gas effluent contains only 0.25 percent of $H_2S$ and $SO_2$, which amounts to a purification yield of 80 percent.

Sulfur is collected in the settling zone in the form of droplets admixed with solvent. The so-produced sulfur contains 1.1 percent by weight of solvent.

EXAMPLE 2 (according to the invention)

Example 1 is repeated, except that, after a run for one hour, ammonia is supplied to the bottom of the column, within the layer of sulfur emulsified in the solvent, collected in the settling zone.

The sulfur droplets quickly coalesce and a sharp interface takes place between the solvent medium and the settled sulfur.

The purification rate of the gas is also 80 percent.

The solvent content of the produced sulfur is then lower than 0.01 percent by weight.

EXAMPLE 3 (according to the invention)

Example 1 is repeated, except that, instead of injecting 0.3 liter of ammonia per hour into the reaction zone, we supply within the sulfur contained in the settling zone, 5 cc per hour of a solution containing 1.34 mole of neutral ammonium sulfide per liter, which solution immediately vaporizes.

The same effect as in Example 2 is observed : the sulfur droplets quickly assemble and the gas purification yield is 80 percent.

The solvent content of the produced sulfur is then lower than 0.01 percent by weight.

EXAMPLE 4 (given by way of comparison)

Example 1 is repeated, also with ammonia injection into the reaction zone and there is supplied, after a 1 hour run, 0.3 liter of nitrogen per hour into the layer of droplets assembled in the decantation zone.

Although the mixture is stirred, we do not observe any coalescence of the sulfur droplets as in Examples 2 and 3.

The gas purification yield is 80 percent.

The produced sulfur contains 1 percent by weight of solvent.

What we claim is:

1. In a process for producing sulfur from a gas containing hydrogen sulfide and sulfur dioxide, wherein the gas in contacted with an organic liquid in a contact zone forming molten sulfur in the contact zone; and a mixture of molten sulfur droplets in the organic liquid are passed to a sulfur settling zone substantially distinct from said contact zone, the improvement comprising:
   introducing a member of the group consisting of ammonia and ammonium sulfide into the settling zone for facilitating coalescense of said molten sulfur droplets whereby the separation of said molten sulfur and said organic liquid is made sharper.

2. A process according to claim 1, wherein the gas contains hydrogen sulfide and sulfur dioxide in a ratio $H_2S$ to $SO_2$ lower than 2:1 by volume.

3. A process according to claim 1, wherein ammonia is supplied to the molten sulfur within the settling zone.

4. A process according to claim 1, wherein ammonia is used in an amount of at least 0.1 percent by weight with respect to the formed sulfur.

5. In a process for producing sulfur from a gas containing hydrogen sulfide and sulfur dioxide, wherein
   a. the gas is contacted with an organic liquid in a contact zone at a temperature of at least the melting point of sulfur, whereby sulfur is formed and appears at least partly in the molten state as a phase separate from the organic liquid;
   b. the gas is separated from the organic liquid and from the molten sulfur;
   c. the molten sulfur and at least a portion of the organic liquid recovered from step (b) are passed to a settling zone substantially distinct from the contact zone, the temperature of said settling zone being at least the melting point of sulfur; and
   d. molten sulfur droplets are separated from the organic liquid,
      the improvement of adding a member of the group consisting of ammonia and ammonium sulfide into the settling zone, whereby the coalescence of the sulfur droplets is improved and the separation between molten sulfur and the organic liquid is made sharper.

6. The process of claim 5, wherein the added member is ammonia.

7. The process of claim 6, wherein ammonia is supplied in an amount of 0.1–10 percent by weight of the formed sulfur.

8. The process of claim 5, wherein the organic liquid is selected from the group consisting of the glycols, the polyglycols and their esters and ethers.

9. The process of claim 5, wherein the temperature is from about 115° to about 170°C.

10. The process of claim 5, wherein the ratio by volume of hydrogen sulfide to sulfur dioxide in the contact zone is lower than 2:1 by volume.

11. The process of claim 5, wherein ammonia, after its passage through the settling zone, is supplied to the contact zone.

* * * * *